(12) United States Patent
Takagi

(10) Patent No.: US 6,224,136 B1
(45) Date of Patent: May 1, 2001

(54) STRUCTURE FOR POSITIONING WINDSHIELD FOR VEHICLE AND METHOD OF MOUNTING WINDSHIELD

(75) Inventor: Masaaki Takagi, Bucks (GB)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/264,136

(22) Filed: Mar. 5, 1999

(30) Foreign Application Priority Data

Mar. 6, 1998 (JP) .................................................. 10-55394

(51) Int. Cl.[7] ...................................................... B60J 1/02
(52) U.S. Cl. ................ 296/96.21; 296/84.1; 296/146.15; 296/201
(58) Field of Search ................................. 296/96.21, 201, 296/146.15, 84.1; 52/204.62, 204.7, 204.591

(56) References Cited

U.S. PATENT DOCUMENTS

| | | | |
|---|---|---|---|
| 5,695,236 | * 12/1997 | Banno et al. | 296/96.21 |
| 5,851,045 | * 12/1998 | Muramatsu | 296/96.21 |
| 6,070,930 | * 6/2000 | Takagi et al. | 296/96.21 |

FOREIGN PATENT DOCUMENTS

| | | |
|---|---|---|
| 0191217 | * 8/1987 | (JP) . |
| 5-32043 | 4/1993 | (JP) . |
| 11020468 | * 1/1999 | (JP) . |

* cited by examiner

*Primary Examiner*—D. Glenn Dayoan
*Assistant Examiner*—Patricia Engle
(74) *Attorney, Agent, or Firm*—Foley & Lardner

(57) ABSTRACT

A flange having a first flange close to a roof panel and a second flange close to roof rail which are mutually overlapped with each other is disposed in a peripheral edge of an opening portion of a vehicle body. A peripheral edge of a window shield panel is bonded on the flange. A spacer inserting port open in both ends is provided between the first flange and the second flange. A first spacer has an inserting portion, a first engaging portion and a locating hole. The inserting portion is inserted into the spacer inserting port from one of the openings, whereby the first spacer is fixed to the flange and the first engaging portion and the locating hole are exposed from the flange. The second spacer is fixed to a peripheral edge of the window shield panel. The second spacer has a second engaging portion engageable with the first engaging portion and a locating pin insertable into the locating hole. When the locating pin is inserted into the locating hole, the second engaging portion is guided to be engaged with the first engaging portion. When the first arid second engaging portions are mutually engaged with each other, the window shield panel is positioned with respect to the flange. Accordingly, a position that both the spacers are engaged is defined without being affected by a spring back due to a press molding of the flange. Therefore, an accuracy that the window shield panel is mounted is improved.

8 Claims, 4 Drawing Sheets

STRUCTURE FOR POSITIONING WINDSHIELD FOR VEHICLE AND METHOD OF MOUNTING WINDSHIELD

The content of Application No. TOKUGANHEI 10-55394, filed Mar. 6, 1998. in Japan is hereby incorporated by reference.

BACKGROUND OF THE INVENTION

The present invention relates to a structure for positioning a windshield panel such as a front window panel, a rear windshield and the like, particularly a windshield bonded and fixed on a flange In an opening portion of a vehicle body, and a method of mounting the same.

Conventionally, as a structure of positioning a windshield of a bonding and fixing type, a structure disclosed in Japanese Utility Model Application Laid-Open No. 5-32643 is known.

SUMMARY OF THE INVENTION

The related structure mentioned above is provided with a notch portion formed on an upper line portion of a flange disposed in a peripheral edge of an opening portion of a vehicle body, a locking piece upward bent from an edge of the notch portion, a contact piece disposed near an upper edge portion of a windshield and engaged with the locking piece, and a hook piece engaged with a lower surface of the edge of the notch portion. The windshield is positioned to the flange by engaging and attaching the hook piece to the lower surface of the notch edge as well as by engaging the contact piece with the locking piece.

However, it is hard to increase an accuracy for bending the locking piece due to a spring back of the bent vehicle body panel, Accordingly, a slippage tends to be generated at an engaging position between the locking piece and the contact piece. When the slippage is generated at the engaging position between the locking piece and the contact piece, the hook piece tends to get out of place from the lower surface of the edge of the notch.

Also, since black print or the like for concealing the bonded portion is applied to the peripheral portion of the windshield, the hook piece or the contact piece can not be seen externally. Accordingly, it is difficult to effect work for engagement between corresponding locking piece and the lower surface of the notch edge, and a completion of the engagement can not be confirmed.

It therefore is an object of the present invention to provide a positioning structure by which a windshield is securely and easily positioned with respect to an opening portion of a vehicle body.

In order to achieve the object mentioned above, a structure for positioning a windshield for a vehicle in accordance with the present invention is provided with a flange, a windshield, a hollow and first and Second spacers. The flange is disposed in a peripheral edge of an opening portion of a vehicle body. The flange has a first member and a second member mutually overlapping with each other. The windshield has a peripheral edge bonded on the flange. The hollow is formed between the first member and the second member. The hollow has a first opening. The first spacer has an inserting portion, a first engaging portion and a locating hole. The first spacer is fixed to the flange when the inserting portion is inserted into the hollow from the first opening, and the first engaging portion and the locating hole are exposed from the flange. The second spacer is fixed to a peripheral edge of the windshield. The second spacer has a second engaging portion engageable with the first engaging portion and a locating pin insertable in the locating hole. An insertion of the locating pin into the locating hole guides the second engaging portion to an engaging position with the first engaging portion. The windshield is positioned with respect to the flange when the first and second engaging portions are mutually engaged with each other.

When the windshield is mounted, at first, the first spacer is mounted to the flange by inserting the inserting portion into the hollow from the first opening. Next, the locating pin of the second spacer fixed to the peripheral edge of the windshield is inserted Into the locating hole of the first spacer, and the second engaging portion of the second spacer is engaged with the first engaging portion of the first spacer. Accordingly, the windshield is positioned with respect to the flange. Finally, the peripheral edge of the windshield is bonded on the flange.

In this case, the first and second spacers are securely engaged at a desired position without being affected by a spring back in accordance with a press-molding of the flange. Accordingly, the windshield is securely positioned with respect to the opening portion of the vehicle body. As a result, an accuracy of mounting the windshield is improved.

Also, the insertion of the locating pin into the locating hole guides the second engaging portion to the engaging position with the first engaging portion, so that the first and second engaging portions can easily be engaged with each other. Accordingly, it is possible to easily position the windshield to fix it.

Further even in a case where the peripheral portion of the windshield has black print or the like for concealing the bonded portion thereof, it is possible to engage the first and second engaging portions with each other by inserting the locating pin into the locating hole.

DESCRIPTION OF THE PREFERRED EMBODIMENTS

Figure 1:
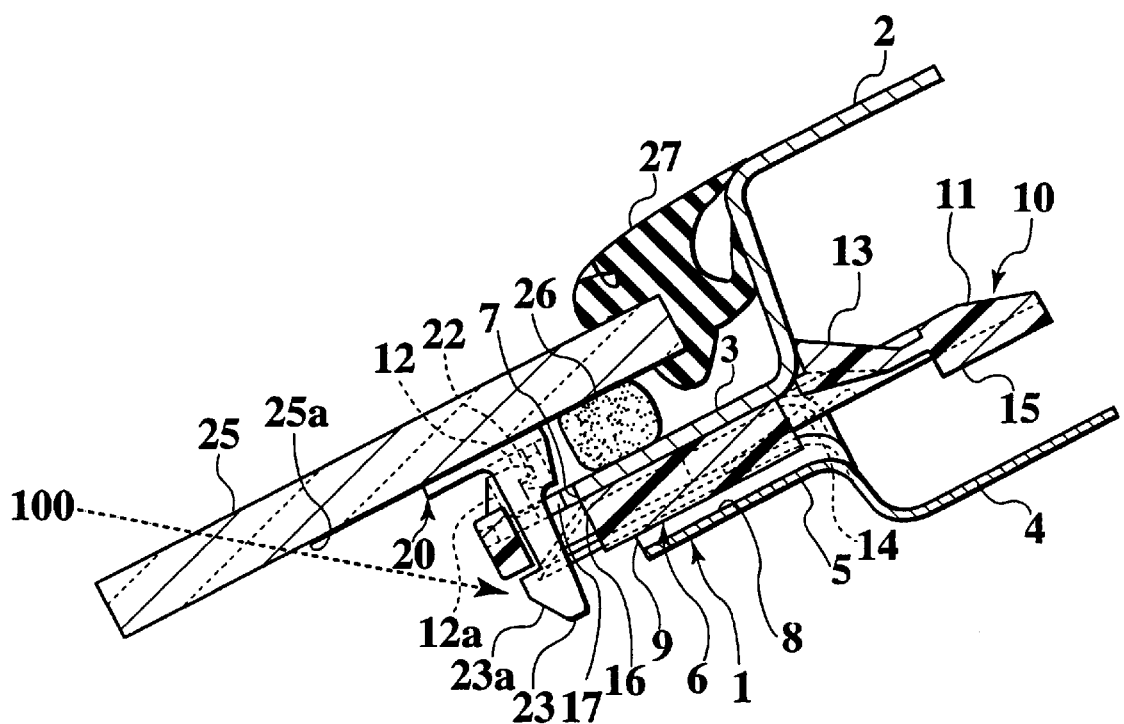
FIG. 1 is a cross sectional view which shows a first embodiment in accordance with the present invention.
Figure 2:
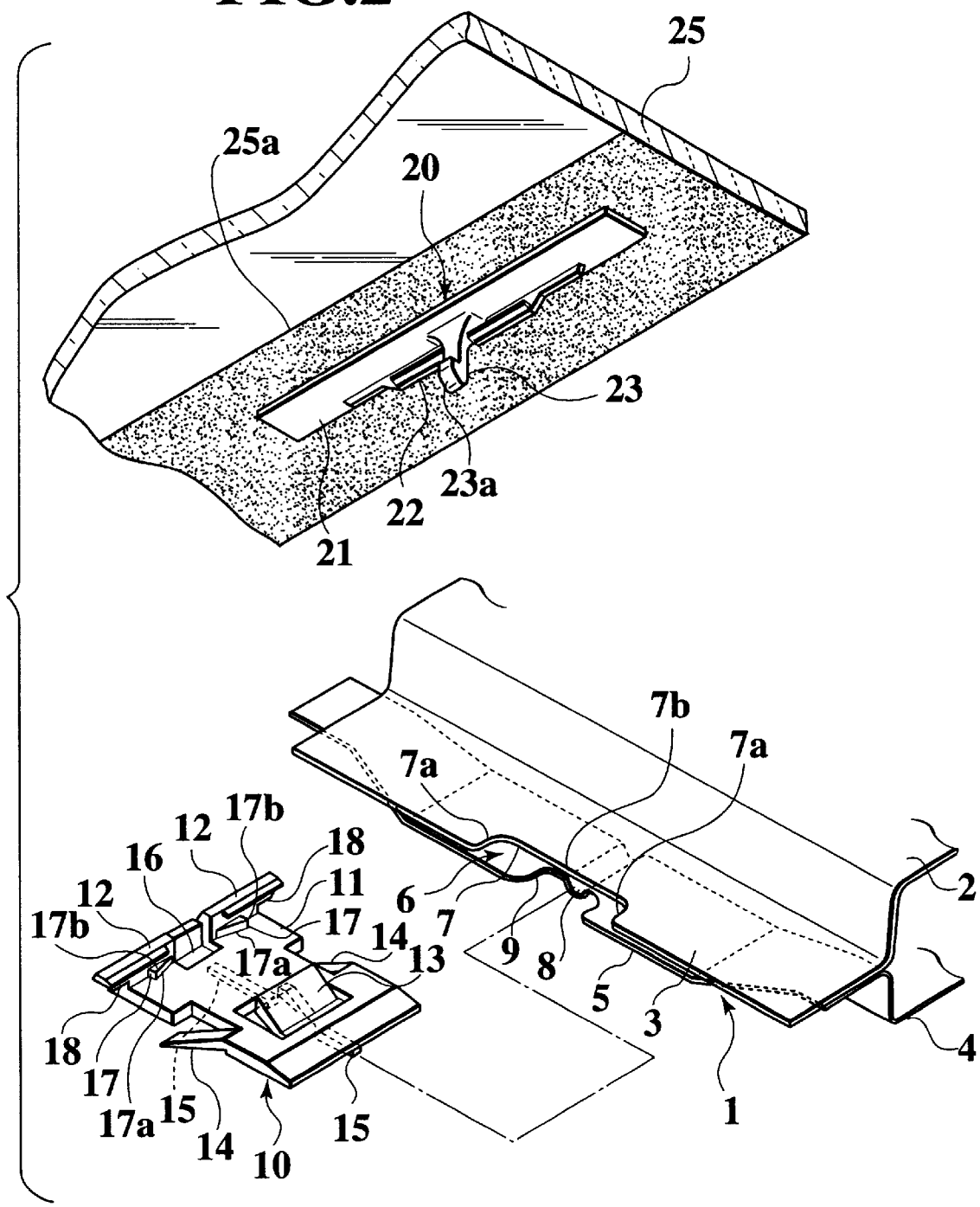
FIG. 2 is an exploded perspective view of FIG. 1.
Figure 3:
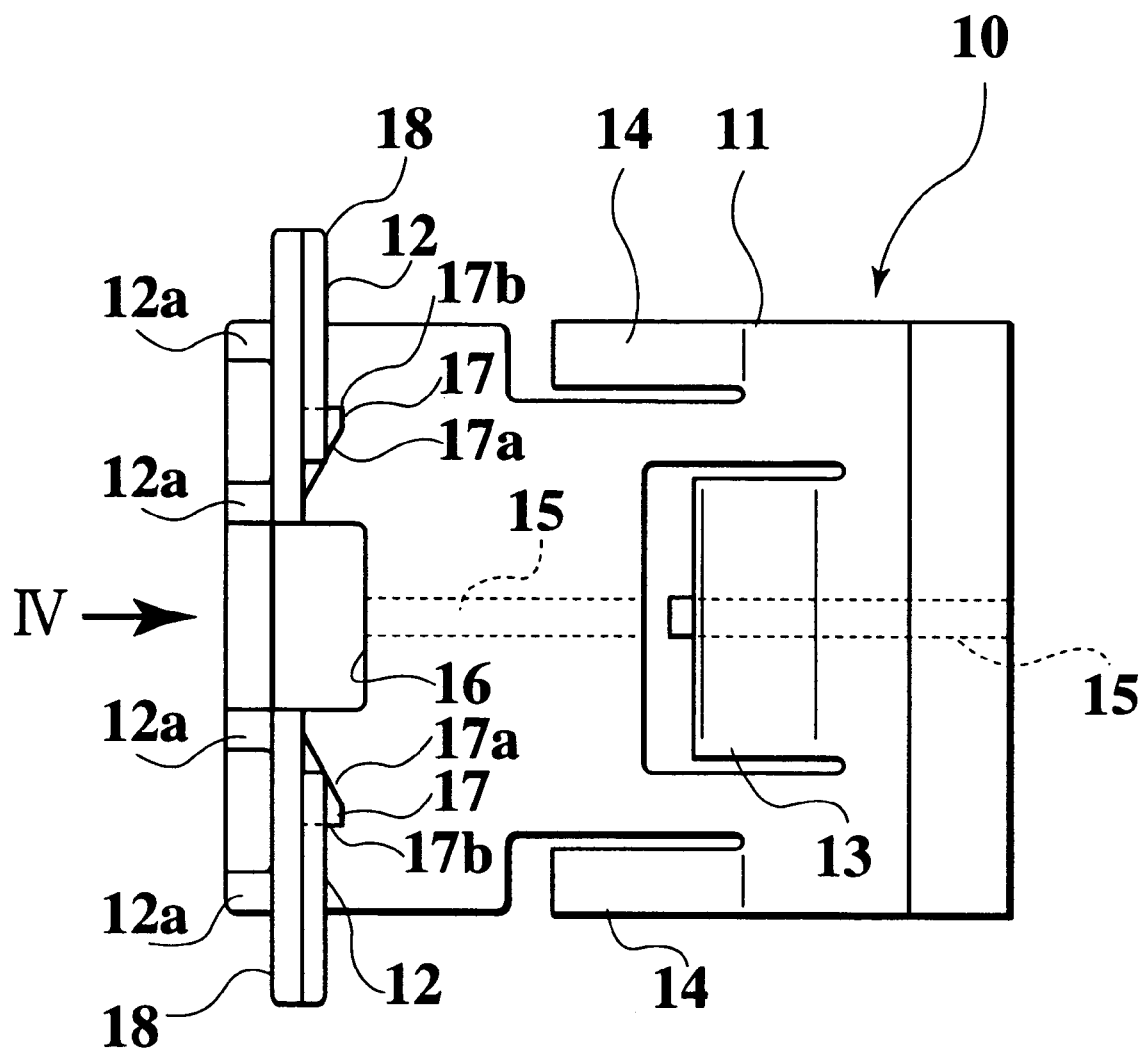
FIG. 3 is a plan view of a flange end spacer.
Figure 4:
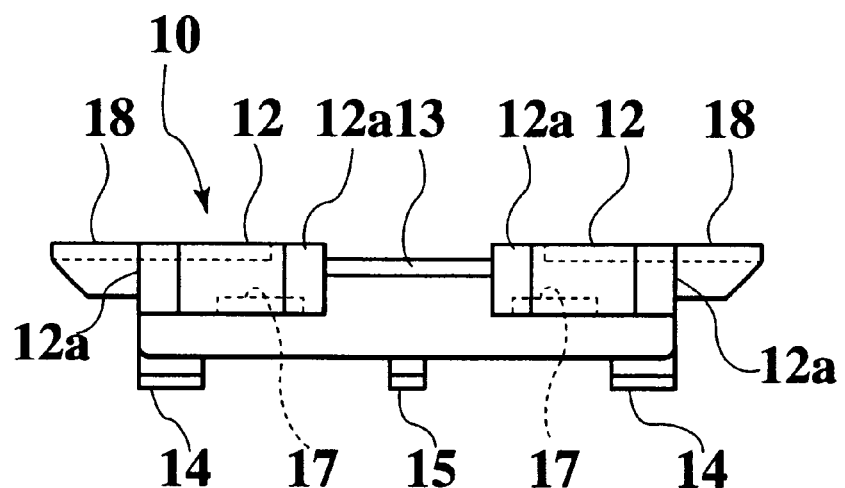
FIG. 4 is a side view viewed from arrow IV of FIG. 3.

A first embodiment in accordance with the present invention will be described below with reference to FIGS. 1, 2, 3 and 4.

In this embodiment, an explanation is given to a front window panel (hereinafter, simply refer to a window panel) as an example of a windshield.

As shown in FIGS. 1, 2, 3 and 4, a flange 1 is disposed in a peripheral edge of an opening portion of a vehicle body. An upper line portion of the flange 1 is constituted by a first flange 3 close to a roof panel 2 and a second flange 5 close to a roof rail 4. Both the flanges 3 and 5 are formed in a plate shape. The first flange 3 integrally extends with the roof panel 2 from a step-like portion bent in an end portion of the roof panel 2. The front roof rail 4 extends in d direction of a vehicle width below the end portion of the roof panel 2. The second flange 5 is bent and extends from an end portion of the front roof rail 4. Both the flanges 3 and 5 are mutually overlapped with each other, and bonded by a spot welding.

A hollow spacer inserting port 6 having openings in both ends is provided In a part of the upper line portion of the flange 1, for example, both right and left sides. The spacer inserting port 6 is formed between both the flanges 3 and 5 by bending the second flange 5 in the opposite direction to the first flange 3.

A notch portion 7 is formed in an edge of an upper wall (first flange 3) of the spacer inserting port 6. The notch portion 7 has a narrower width than a thrusting portion 11 of a flange end spacer 10 mentioned below. The notch portion 7 has a pair of opposite edges 7a and a contact edge 7b between the opposed edges 7a. A positioning groove 8 is formed in a center portion of a bottom wall (second flange 5) in the spacer inserting port 6. The positioning groove 8 extends in a direction that the thrusting portion 11 is inserted to the spacer inserting port 6. A notch portion 9 is formed in a front edge portion of the positioning groove 8 in order to prevent a locating pin 23 of a panel end spacer 20 mentioned below and the bottom wall of the spacer inserting port 6 from interfering with each other.

The flange end spacer 10 is provided with the thrusting portion (inserting portion) 11, an engaging portion 12, a locating hole 16 and thrust positioning stoppers 17. The flange and spacer 10 is made of an elastic material such as a rubber, a synthetic resin and the like. The thrusting portion 11 is inserted into the spacer inserting port 6 and fixed thereto. The engaging portion 12 projects from an upper surface of a front edge portion of the thrusting portion 11 and reinforced with ribs 12a. The engaging portion 12 projects above the flange 1 when the thrusting portion 11 is inserted to the spacer inserting port 6.

A hook portion 13 passing through the spacer inserting port 6 and engaging with a bent portion of the first flange 3 (a peripheral edge portion of the other of the openings in the spacer inserting port 6) integrally projects from the center of the end portion in the thrusting portion 11.

A spring piece 14 is integrally formed in both side portions of the thrusting portion 11. The spring piece 14 is elastically brought into contact with the bottom wall of the spacer inserting port 6, and brings the thrusting portion 11 into contact with the upper wall of the spacer inserting port 6 in a pressing manner by a reacting force thereof.

The spring piece 14 obliquely extends from a front end of the inserting direction to the spacer inserting port 6 toward a rear end in such a manner as to be capable of being smoothly inserted without being hooked to the edge of the lower opening in the spacer inserting port 6 at a time of inserting the thrusting portion 11 to the spacer inserting port 6.

A projecting portion 15 engaging with the positioning groove 8 in they bottom wall of the spacer inserting port 6 is integrally formed in the center portion of the bottom surface in the thrusting portion 11.

The locating hole 16 has a rectangular shape and passes through a central portion of a front edge portion of the thrusting portion 11 formed with the engaging portion 12. The engaging portion 12 projects from both left and right sides of the locating hole 16. The thrust positioning stoppers 17 are disposed at both left and right sides of the locating hole 16. Each stopper 17 is formed in a generally right-angled triangular column provided with a pin guide surface 17a slanting towards a lower edge side (front edge aide) of the locating hole 16 and an outer surface 17b engaging with the opposite edges 7a of the notch portion 7

In a state where the thrusting portion 11 is inserted into the spacer inserting port 6 and the hook portion 13 is engaged with the bent portion of the first flange 3, a slight clearance (for example, 1 mm or so) is formed between inserting tips of the stoppers 17 and the contact edge 7b of the notch portion 7. The clearance absorbs a dimensional error in front and rear directions of the first flange 3.

Sinking preventing stoppers 18 project from both left and right ends (both ends in a widthwise direction) of the thrusting portion 11. The stoppers 18 are disposed at positions above heights of the stoppers 17 with respect to an upper surface of the thrusting portion 11. Accordingly, the stoppers 18 are positioned on outer surfaces of left and right edge portions of the notch portion 7 in a state where the thrusting portion 11 is completely inserted into the spacer inserting port 6 and the stoppers 17 are inserted in the notch portion 7. Also, when the stoppers 17 advance in the notch portion 7, the stoppers 18 are prevented from being caught by an upper edge (first member 3) of the spacer inserting port 6.

The panel end spacer 20 is made of an elastic material which is the same as that of the flange end spacer 10. The panel end spacer 20 is mounted near the upper edge of the window panel 25. The panel end spacer 20 is disposed at a position corresponding to the flange end spacer 10 fixed to the flange 1.

The panel end spacer 20 is provided with a base portion 21, the engaging portion 12 and a locating pin 23. The base portion 21 is bonded and fixed to the surface of the windshield 25 by means of an adhesive, for example, a both side adhesive tape. An engaging portion 22 projects from the base portion 21 and is engaged with the engaging portion 12 of the flange end spacer 10. The locating pin 23 projects from a center of a portion where the engaging portion 22 is formed. The locating pin 23 has an amount of projection larger than that of the engaging portion 22.

The engaging portion 12 of the flange end spacer 10 and the engaging portion 22 of the panel and spacer 20 have hook shapes which are mutually meshed with each other in a first direction in which the flange 1 extends (a direction substantially parallel to the window panel 25) and a second direction perpendicular to the flange 1 (a direction substantially perpendicular to the window panel 25).

The locating pin 23 is provided with a hook-shaped tip end portion having a slant guide surface 23a. When the tip end portion passes through the locating hole 16, the guide surface 23a contacts in a sliding manner with a lower edge (front edge) of the locating hole 16 to restrict movement position of the window shield panel 25. Accordingly, a hook end of the engaging portion 22 is moved while it is spaced from a hook end of the engaging portion 12, thereby preventing the engaging portions 12 and 22 from interfering with each other. When the locating pin 23 is completely inserted into the locating hole 16, the tip end portion of the locating pin 23 passes through the locating hole 16 to project below the flange end spacer 10 so that the locating pin 23 is prevented from getting out of the locating hole 16. An amount of projection of the locating pin 23 is set to such a size that the tip end portion of the locating pin 23 can be seen slightly from a lower edge of a blind portion 25a through the window panel 25 when the locating pin 23 is viewed from the front side of the window panel 25.

The size of the locating hole 16 in a direction of a vehicle width is set to be sufficiently large as compared with the axis width of the locating pin 23 (for example, about three or four times the axis width of the locating pin 23) in order to absorb an error in fixing position of the panel end spacer 20 with respect to the direction of the vehicle width. The size of the locating hole 16 in the vertical direction (front and rear direction) is set to a size in which the axial portion of the locating pin 23 is spaced from the front edge of the locating hole 16 when the engaging portions 12 and 22 are engaged with each other. The shape (hook shape) of the tip and portion of the locating pin 23 is formed such that the hook engaging edge is spaced from the lower surface side edge portion of the locating hole 16 when the engaging portions 12 and 22 are engaged with each other. Accordingly, when the engaging portions 12 and 22 are engaged with each other, the locating hole 16 and the locating pin 23 are put in non-contact with each other.

The peripheral edge portion of the window panel 25 is bonded and fixed on the flange 1 by means of an adhesive 26. A decorative window molding 27 is fitted and fixed to the peripheral edge of the window panel 25.

In accordance with the structure mentioned above, the window panel 25 is mounted in the following manner.

At first. The flange end spacer 10 is inserted and fixed to the spacer inserting port 6 disposed in the upper line portion of the flange 1, and the adhesive 26 is applied to the peripheral edge portion of the window panel 25.

Next, the upper edge portion of the window panel 25 is positioned just above the flange 1 and the locating pin 23 of the panel end spacer 20 is inserted into the locating hole 16 of the flange end spacer 10. Accordingly, the engaging portion 22 of the panel end spacer 20 is engaged with the engaging portion 12 of the flange end spacer 10, so that the window panel 25 is positioned and temporarily held by the spacers 10 and 20.

Finally, the window panel 25 is pressed onto the flange 1. Accordingly, the window panel 25 is fixed on the flange 1 by the adhesive 26.

The flange end spacer 10 is inserted and fixed to the spacer inserting port 6 formed by partly detaching the portion in which the first flange 3 and the second flange 5 are overlapped. Then, the engaging portion 12 of the flange end spacer 10 and the engaging portion 22 of the panel end spacer 20 adhered to the window panel 25 are mutually engaged with each other. Accordingly, a position of engaging the flange end spacer 10 with the panel end spacer 20 is defined without being affected by a spring back due to a press molding of the flange 1. Therefore, the upper edge portion of the window panel 25 is securely positioned and fixed to the upper line portion of the flange 1 in the opening portion of the vehicle body. As a result, an accuracy of mounting the window panel 25 is improved.

The window panel 25 has a blind portion (black print) 25a for concealing the bonded portion in a peripheral edge portion thereof. However, since the tip end of the locating pin 23 on the panel end spacer 20 can be viewed outside of the blind portion 25a through the window panel 25, the locating pin 23 can be inserted into the locating hole 16 while the tip end of the pin 23 is being watched. Furthermore, the insertion of the locating pin 23 into the locating hole 16 guides the engaging portion 22 to an engaging position with the engaging portion 12. Accordingly, the positioning and fixing works for the window panel 25 can be performed while they are being confirmed with eyes, so that the workability is enhanced. Also, since the engagement between the locating pin 23 and the locating hole 16 can easily be confirmed, an incomplete engagement between the engaging portions 12 and 22 is avoided so that the window panel 25 is securely positioned and fixed.

When a guide surface 23a of the locating pin 23 passes through the locating hole 16, it contacts with the lower edge (front edge) of the locating hole 16 in a sliding manner, so that a movement position of the window panel 25 is restricted. Accordingly, the hook end of the engaging portion 22 is moved in a state where it is spaced from the hook end of the engaging portion 12, thereby preventing the engaging portions 12 and 22 from interfering with each other. As a result, the locating pin 23 is easily and securely inserted into the locating hole 16 so that the engaging portion 22 is securely guided to the engaging position with the engaging portion 12. Also, since the locating pin 23 and the locating hole 16 are put in a non-contacting situation when the engaging portions 12 and 22 are engaged with each other, the load of the window panel 25 does not act on the locating pin 23. Accordingly, the locating pin 23 is prevented from breaking, bending or the like. Furthermore, it is avoided that a large peeling-off load acts on the fixed portion of the panel end spacer 20.

The engaging portions 12 and 22 have the hook-shaped portions, and the self-weight of the window panel 25 acts in a direction in which the engaging portions 12 and 22 are engaged with each other. Accordingly, the engaging portions 12 and 22 are securely mutually engaged with each other. Also, a slippage is prevented from occurring due to rising of the window panel 25, so that an accuracy of mounting the window panel 25 is improved.

In addition to an effect of such an improvement in an accuracy of mounting the window panel 25, both the locating hole 16 and the locating pin 23 are respectively disposed at central portions of the engaging portions 12 and 22 of the flange end spacer 10 and the panel end spacer 20. Accordingly, the locating hole 16 and the locating pin 23 can be provided without enlarging the surface areas of the spacers 10 and 20, so that it is avoided that the spacers 10 and 20 are large-sized.

On the other hand, an operation of assembling the flange end spacer 10 to the upper line portion of the flange 1 is performed by inserting the thrusting portion 11 of the flange end spacer 10 into the spacer inserting port 6. At this time, in a state that the projecting portion 15 in the bottom surface of the flange end spacer 10 is engaged with the positioning groove 8 in the bottom wall of the spacer inserting port 6. The thrusting portion 11 is inserted into the spacer inserting port 6. Due to this engagement, a positioning of the thrusting portion 11 in right and left directions of the spacer inserting port 6 (a direction perpendicular to the inserting direction of the thrusting portion 6) is performed. Accordingly, the thrusting portion 6 is guided and smoothly inserted.

Still further, when the thrusting portion 6 is completely thrust, the hook portion 13 above the thrusting portion 11 passes through the spacer inserting port 6 and is engaged with the bent base portion of the first flange 3. In this state, the spring piece 14 is elastically brought into contact with the bottom wall of the spacer inserting port 6, and the thrusting portion 11 is brought into contact with the upper wall of the spacer Inserting port 6 in a pressing manner due to the reacting force. Accordingly, the hook portion 13 is securely engaged with the bent base portion of the first flange 3, and the flange end spacer 10 is assembled to a desired position.

As a result, the flange end spacer 10 is securely fixed in a one-touch manner, so that a mounting operability is improved.

When the thrusting portion 11 is inserted up to a position where the hook portion 13 passes through the spacer inserting port 6, the stoppers 17 of the thrusting portion 11 advance in the notch portion 7 to abut against the contact edge 7b so that the hook portion 13 of the flange end spacer 10 is engaged with the bent portion of the flange 3. The stoppers 17 restrict a thrust amount of the thrusting portion 11. Also, the outer surfaces 17b of the stoppers 17 are engaged with the opposite edges 7a of the notch portion 7. Therefore, the positions of mounting the flange end spacer 10 in the vertical direction and the direction of the vehicle width are defined and the positions of the engaging portion 12 and the locating hole 16 are determined. Accordingly, an insertability of the locating pin 23 into the locating hole 16 and an engageabiliy between the engaging portions 12 and 22 are improved. It is to be noted that when the hook portion 13 is engaged with the bent portion of the flange 3 and The engaging portions 12 and 22 are mutually engaged with each other, the stoppers 17 are separated from the contact edge 7b.

Even in a case that the tip end portion of the locating pin 23 has been shifted slightly in left or right direction of the locating hole 16 to abut on the surface of the thrusting portion 11 in the course of insertion of the locating pin 23 into the locating hole 16, the locating pin 23 is guided into the locating hole 16 by the guide surfaces 17a of the stoppers 17. Accordingly, the insertability of the locating pin 23 is further improved.

Furthermore, the sink preventing stoppers 18 are positioned at outer surfaces (outer surface of the first flange 3) of the left and right edge portions of the notch portion 7 in a situation where the thrusting portion 11 has completely been inserted in the spacer inserting port 6. When the flange end spacer 10 is subjected to the load of the window panel 25, the stoppers 18 abut on the outer surface of the flange 3 to prevent the spacer 10 from sinking (moving downward). Accordingly, the projected position of the engaging portion 12 from the flange 1 is made stable, so that the engagement of the engaging portion 12 with the engaging portion 22 of the panel end spacer 20 Is further secured.

Figure 5:
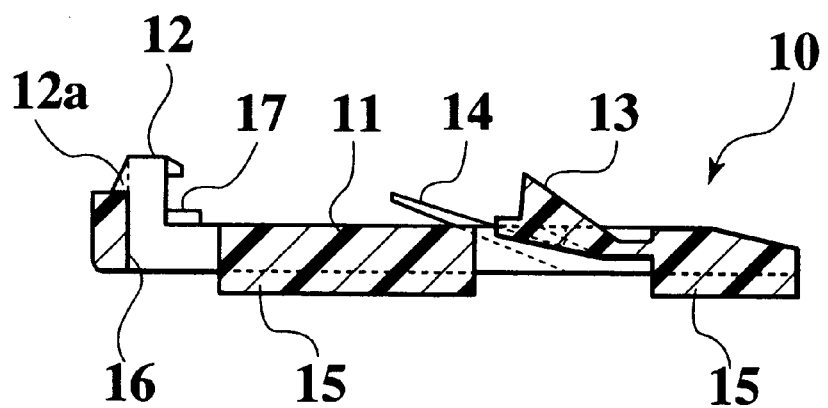
FIG. 5 is a cross sectional view which shows another example of a flange end spacer.

FIG. 5 shows another example of the flange end spacer 10. The spring piece 14 of this example projects upwardly, which is an inverse direction with respect to the projecting direction in the above-mentioned embodiment shown in FIG. 2. The spring piece 14 resiliently contacts with the upper wall of the spacer inserting port 6, and the thrusting portion 11 is caused to pressure-contact with the bottom wall of the spacer inserting port 6 by the reaction force.

As a result, according to this example, the thrusting portion 11 is seated on the bottom wall of the spacer inserting port 6 with pressure-contact. Accordingly, the hook portion 13 is securely engaged with the bent portion of the first flange 3, and the flange end spacer 10 is securely fixed. Also, shaking of the flange end spacer 10 due to the load of the window panel 25 can be suppressed.

Here, in the embodiments mentioned above, the explanation is given to the structure for mounting the front window panel, however, the present invention is not limited to this, and for example, the same effect is obtained in the case of being applied to a structure for mounting a rear window panel.

What is claimed is:

1. A structure for positioning a windshield for a vehicle, comprising:
   a flange disposed in a peripheral edge of an opening portion in a vehicle body, the flange having a first member and a second member mutually overlapping with each other,
   a windshield having a peripheral edge bonded on the flange;
   a hollow portion formed between the first member and the second member, the hollow portion having a first opening;
   a first spacer having an inserting portion, a first engaging portion and a locating hole, the first spacer being fixed to the flange and the first engaging portion and the locating hole being exposed from the flange when the inserting portion is inserted into the hollow portion from the first opening; and
   a second spacer fixed to the peripheral edge of the windshield, the second spacer having a second engaging portion engageable with the first engaging portion and a locating pin insertable into the locating hole, insertion of the locating pin into the locating hole guides the second engaging portion to an engaging position with the first engaging portion, and the windshield being positioned with respect to the flange when the first and second engaging portions are mutually engaged with each other,
   wherein the first spacer has a hook portion, and
   the hook portion is engaged with the flange when the inserting portion is inserted into the hollow portion, so that the first spacer is fixed to the flange,
   wherein the hollow portion has a second opening opposing the first opening; and
   the hook portion projecting from the inserting portion passes through the hollow portion so as to be engaged with a peripheral edge of the second opening,
   wherein the hollow portion is defined with a first inner surface of the first member and a second inner surface of the second member,
   the first opening is defined with leading edges of the first and second members, and
   the inserting portion of the first spacer has a spring piece which is in elastic contact with the first inner surface so as to press the inserting portion to the second inner surface.

2. A structure for positioning a windshield for a vehicle, comprising:
   a flange disposed in a peripheral edge of an opening portion in a vehicle body, the flange having a first member and a second member mutually overlapping with each other;
   a windshield having a peripheral edge bonded on the flange;
   a hollow portion formed between the first member and the second member, the hollow portion having a first opening;
   a first spacer having an inserting portion, a first engaging portion and a locating hole, the first spacer being fixed to the flange and the first engaging portion and the locating hole being exposed from the flange when the inserting portion is inserted into the hollow portion from the first opening; and
   a second spacer fixed to the peripheral edge of the windshield, the second spacer having a second engaging portion engageable with the first engaging portion and a locating pin insertable into the locating hole, insertion of the locating pin into the locating hole guiding the second engaging portion to an engaging position with the first engaging portion, and the windshield being positioned with respect to the flange when the first and second engaging portions are mutually engaged with each other, wherein
   the first and second engaging portions have hook shapes mutually engageable with each other to prevent the first and second members from relatively moving in a first direction substantially parallel to the windshield and in a second direction substantially perpendicular thereto, wherein the first opening is defined with leading edges of the first and second members, the first member has a notch portion formed at an edge of the first opening, the notch portion has a pair of opposite edges and a contact edge between the opposite edges, and the inserting portion has positioning stoppers which are engaged with the opposite edges to position the first spacer with respect to the first member and contact with the contact surface of the notch portion to define an inserting limit of the inserting portion into the hollow portion.

3. A positioning structure according to claim 2, wherein the windshield is caused to rest on the first member to be bonded on the flange, and the first spacer has sink preventing stoppers positioned on an outer surface of the first member in a state where the inserting portion is inserted in the hollow portion.

4. A positioning structure according to claim 2, wherein the locating pin and the locating hole are put in a non-contact situation in a state where the first and second engaging portions are mutually engaged with each other.

5. A positioning structure according to claim 2, wherein the positioning stoppers have pin guide surfaces slanting toward the locating hole, and the locating pin is guided to the locating hole along the pin guide surfaces.

6. A structure for positioning a windshield for a vehicle, comprising:

a flange disposed in a peripheral edge of an opening portion in a vehicle body, the flange having a first member and a second member mutually overlapping with each other;

a windshield having a peripheral edge bonded on the flange;

a hollow portion formed between the first member and the second member, the hollow portion having a first opening;

a first spacer having an inserting portion, a first engaging portion and a locating hole, the first spacer being fixed to the flange and the first engaging portion and the locating hole being exposed from the flange when the inserting portion is inserted into the hollow portion from the first opening; and a second spacer fixed to the peripheral edge of the windshield, the second spacer having a second engaging portion engageable with the first engaging portion and a locating pin insertable into the locating hole, insertion of the locating pin into the locating hole guiding the second engaging portion to an engaging position with the first engaging portion, and the windshield being positioned with respect to the flange when the first and second engaging portions are mutually engaged with each other, wherein the locating pin projects from a central portion of the second engaging portion, and the locating hole is positioned at a center of the first engaging portion.

7. A positioning structure according to claim 6, wherein the windshield has a blind portion on the peripheral edge, the second spacer is fixed to the blind portion, and a tip end of the locating pin is viewed outside of the blind portion thorough the windshield.

8. A method of mounting a windshield for a vehicle, comprising the steps of:

mounting a first spacer to a flange disposed in a peripheral edge of an opening portion in a vehicle body, wherein the flange has a first member and a second member mutually overlapping with each other, a hollow portion has a first opening and a second opening opposing the first opening and is formed between the first member and the second member, the first spacer has an inserting portion, a first engaging portion, a locating hole, and a hook portion, and the inserting portion is inserted into the hollow portion from the first opening such that the first engaging portion and the locating hole are exposed from the flange, the hook portion engages the flange, and the hook portion projects from the inserting portion and passes through the hollow portion so as to engage with a peripheral edge of the second opening;

inserting a locating pin of a second spacer fixed to a peripheral edge of the windshield into the locating hole, so that a second engaging portion of the second spacer is thereby guided by and engaged with the first engaging portion, the hollow portion is defined with a first inner surface of the first member and a second inner surface of the second member, the first opening is defined with leading edges of the first and second members, the inserting portion of the first spacer has a spring piece in elastic contact with the first inner surface so as to press the inserting portion to the second inner surface, and the windshield is positioned with respect to the flange; and bonding the peripheral edge of the windshield on the flange.

* * * * *